(No Model.)
R. C. MEAD.
STANCHION.
No. 341,107. Patented May 4, 1886.
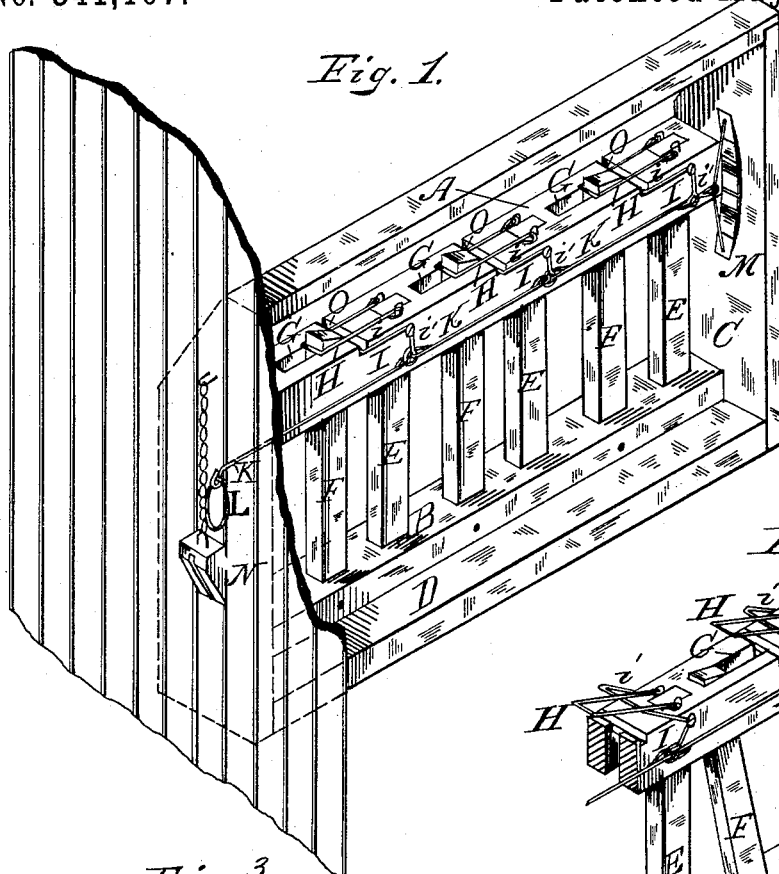
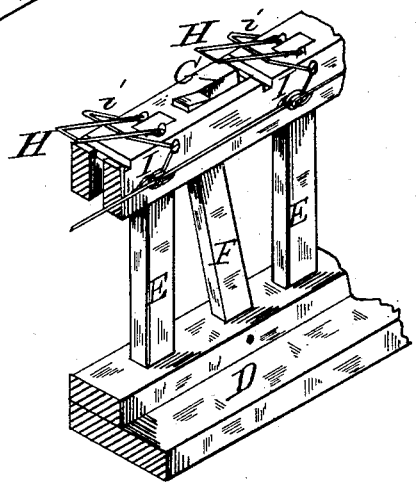
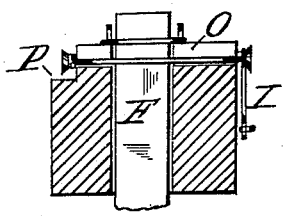
Witnesses
Wm F. Huntemann
Chas E. Barber.
Inventor
Reuben C. Mead.
By his Attorneys
Whittlesey & Wright

United States Patent Office.

REUBEN CASH MEAD, OF NEW HAMPTON, ASSIGNOR OF ONE-HALF TO JOHN E. EARLE, OF MIDDLETOWN, NEW YORK.

STANCHION.

SPECIFICATION forming part of Letters Patent No. 341,107, dated May 4, 1886.

Application filed January 26, 1886. Serial No. 189,852. (No model.)

*To all whom it may concern:*

Be it known that I, REUBEN CASH MEAD, a citizen of the United States, residing at New Hampton, in the county of Orange and State of New York, have invented certain new and useful Improvements in Stanchions; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of my invention is to so construct a series of stanchions as to enable a number of cattle to be simultaneously released, the construction being such, however, that one or more animals can, if desired, be secured or released without disturbing the others.

In the drawings similar letters of reference refer to similar parts.

Figure 1 is a perspective view showing the stanchions closed. Fig. 2 shows the manner of opening the stanchions to release the cattle. Fig. 3 is a detail sectional view.

The stanchion-frame A B C D is of the usual construction. The stationary stanchion-bars E E are firmly secured at each end to this frame. The movable stanchion-bars F F are pivoted at their lower ends to the floor or to the cross-bar B. Each pivot is at one side of the vertical line passing through the center of gravity of the bar, so that the latter tends to fall away from its companion stationary bar. The upper ends of the movable stanchion-bars are received in guides G G, formed in or attached to the upper cross-bar, A, and project slightly above said cross-bar. They are beveled, as shown, to enable them to lift the hinged holding-loops H H, when the movable stanchion-bars are closed to secure the cattle, the loops dropping down over the projecting ends of the bars, as shown in Fig. 1.

As each loop H is free to rise and fall independently of the others, it will be readily understood that any one or more animals can be secured or released without disturbing the others; but it may be desirable at times to liberate all the cattle at once, as for the purpose of driving them to pasture, but more especially in event of a fire, a flood, or any other sudden emergency. For accomplishing this result I provide a series of bell-crank levers, I I, which are located entirely out of the path of movement of the stanchion-bars F F, so as not to hamper or interfere with their freedom in any way. The horizontal arms *i i* of these levers lie under the loops H H. The vertical arms *i' i'* lie outside of the cross-bar A, and do not come in contact with or actuate the stanchion-bars F F or any other part of the device. A series of connecting-rods, K K, unites the several lever-arms *i' i'*, whereby said levers can be moved simultaneously one way or the other. One of these rods K passes out through the wall or other siding of the stable, and is provided with a handle, L, or a lever, or other convenient means for operating it from the exterior of the building. At the other end of the rods is a spring, M, or a weight to retract said rods and retain the lever-arms *i i i' i'* normally in the position shown in Fig. 1. The sole purpose of this mechanism is to lift and lower the holding-loops H H without in any way interfering with or restricting the operation of the other parts.

The operation of these devices is apparent. By pulling at the handle L the rods K K cause the bell-crank levers to lift the hinged loops H H, thus setting free the movable stanchion-bars F F, which fall away and release the cattle, as shown in Fig. 2. A suitable fastening device—such as the wedge N inserted behind the handle L—serves to keep the loops H H raised, so that in case any one of the movable stanchion-bars should bind in its guide G, it would still be possible for the animal to force it open and escape. When at any subsequent time the wedge N is withdrawn, the bell-crank levers are returned to their normal position by the spring M and rods K K, while the loops H H are lowered upon the cross-bar A, in readiness to be lifted by the beveled upper ends of the movable stanchion-bars when they are closed to secure the cattle again.

By having the handle L on the outside of the building, one can release the cattle without entering, which is an advantage in case of fire when the stable may be full of smoke.

For the sake of cheapness and ease of construction, I prefer to make my holding-loops, bell-crank levers, and connecting-rods out of iron rods or other similar material, in substantially the form shown in the drawings, so that they can be readily constructed by any blacksmith. The holding-loops and the part $i$ of the bell-crank levers are substantially U-shaped, as shown. The latter may be received in notches O, cut in the cross-bar A, and one or both sides of the cross-bar may be recessed, as shown at P, Fig. 3, to prevent the cattle from interfering with the mechanism.

I am aware that a series of slotted hinged latches has been connected by cords or chains to a sliding bar provided with inclines on its under side, whereby, when the bar is slid lengthwise in its supports, it will be raised and will lift all the latches and release the stanchion-bars, which are then thrown open by springs.

I am also aware that a series of levers has been used, each one engaging with a movable stanchion-bar, and provided with a special rod running to a lever, whereby it may be operated to open or close the stanchion-bar, each lever also having a pin or lug for lifting the link, which retains the stanchion-bar in place when closed. Every time a lever is actuated it opens or closes its stanchion-bar. Nor can a stanchion-bar be moved without at the same time actuating its lever. For this reason the levers cannot be advantageously united to move simultaneously as in my construction, since this would prevent the independent manipulation of any one or more of the stanchion-bars in case it was desired to release but one or two or a few of the animals.

Any one or more of the stanchion-bars in my device can be operated without disturbing either the other bars or any of the levers.

What I claim as new, and desire to secure by Letters Patent, is—

1. The combination, with the cross-bars A and B, of a series of stationary stanchion-bars, a series of movable stanchion-bars, a series of hinged holding-loops, a series of bell-crank levers located out of the path of the movable stanchion-bars so as not to restrict their freedom in any way, one arm of each lever lying under its corresponding holding-loop, the other arms being united by a series of connecting-rods, substantially as and for the purpose set forth.

2. The combination, of the cross-bar A, provided with guides G G, with the cross-bar B, a series of stationary stanchion-bars, a series of movable stanchion-bars, a series of hinged holding-loops, a series of bell-crank levers located out of the path of the movable stanchion-bars, one arm of each lever being arranged to lift its corresponding holding-loop, a series of connecting-rods uniting the other arms of said levers, and means for returning them to and retaining them in a normal position, substantially as and for the purpose set forth.

3. The combination, with the cross-bar A, provided with guides G G, of the cross-bar B, a series of stationary stanchion-bars, a series of movable stanchion-bars pivoted at one side of their center of gravity, a series of hinged U-shaped holding-loops, a series of bell-crank levers located out of the path of movement of the pivoted stanchion-bars, one arm of each lever lying under its corresponding holding-loop, and a series of connecting-rods uniting the other arms of said levers, substantially as and for the purpose set forth.

4. The combination, with the cross-bar A, having the guides G G, of the cross-bar B, a series of stationary stanchion-bars, a series of movable stanchion-bars, a series of hinged holding-loops, a series of bell-crank levers located out of the path of the movable stanchion-bars, a series of rods connecting said levers, a handle, L, a retracting device, M, and a wedge, N, substantially as and for the purpose set forth.

In testimony whereof I affix my signature in presence of two witnesses.

REUBEN CASH MEAD.

Witnesses:
WM. H. BEAKES,
I. L. MILLS.